United States Patent Office 2,734,303
Patented Feb. 14, 1956

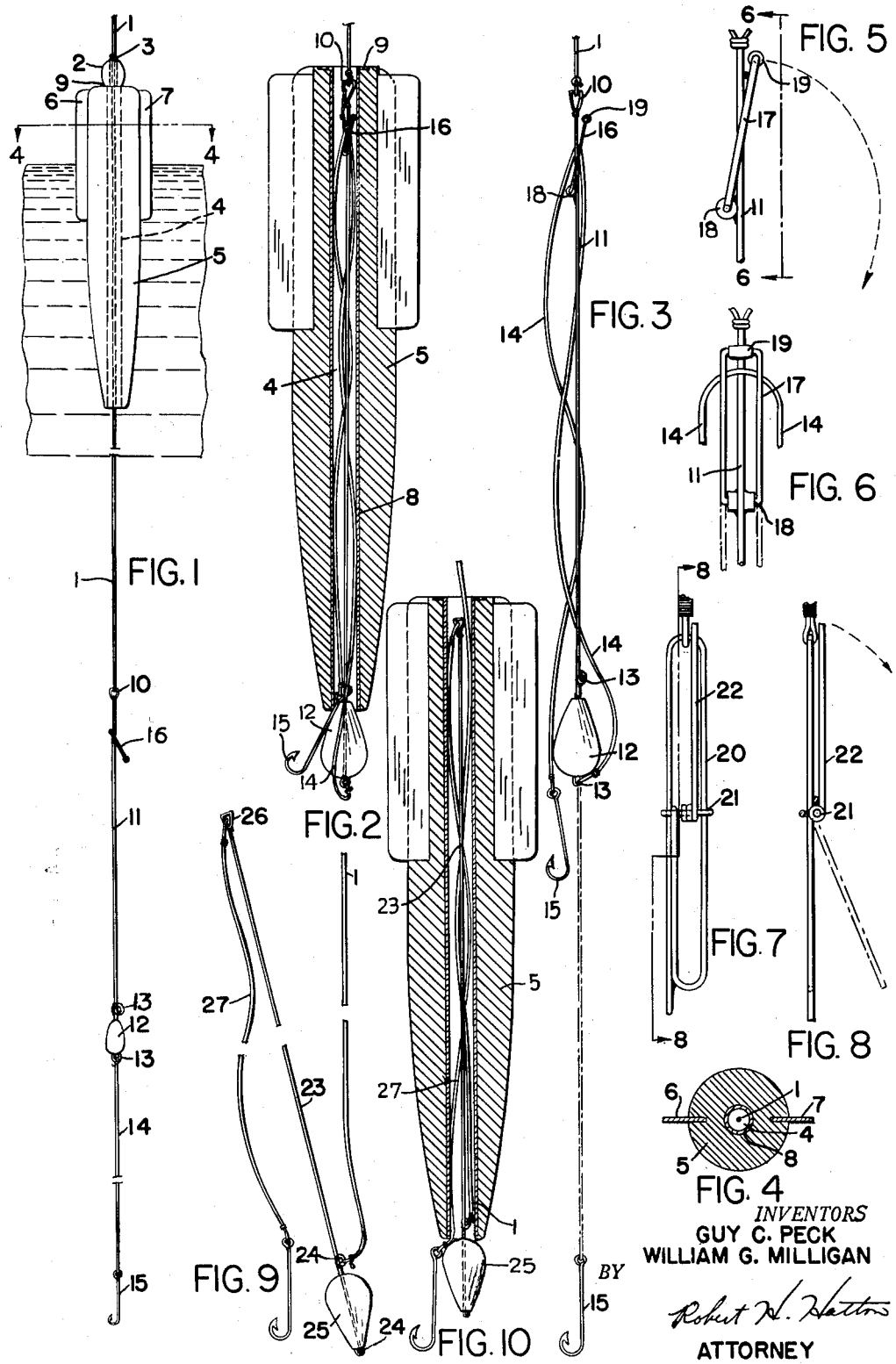

2,734,303
FISHING BOBBER

Guy C. Peck and William G. Milligan, Akron, Ohio

Application May 4, 1953, Serial No. 352,776

6 Claims. (Cl. 43—43.11)

This invention relates to fishing tackle and more particularly to an improved bobber assembly for use in fishing.

In fishing it is essential that the fisherman be assured that his hook is at the proper depth and that it does not become tangled with any part of the tackle. Many types of floats and bobbers have been proposed to accomplish this, but are unsatisfactory for one reason or another. The most ideal way to accomplish the desired results is to temporarily protect the bait, leader, weight, bobber, etc., by maintaining them in a group while the cast is being made. As the bobber hits the water at the end of the cast, the bait, leader and weight should then be released instantly so that the desired fishing depth will be attained with the bobber remaining on the surface of the water. It is essential that positive means be provided to insure this result. It is therefore and object of the invention to provide an apparatus to protect the bait, leader, and weight while the cast is made.

Another object of the invention is to provide a bobber which will cast on a straight and true path.

A still further object of this invention is to provide a bobber assembly that has little opportunity to become entangled while in use.

These and other objects will become apparent herein as the description hereof proceeds and in the claims hereunto appended.

In the drawings:

Figure 1 is an elevation of the invention in the fishing position;

Figure 2 is a sectional view of the bobber assembly in the casting position;

Figure 3 is a view of a portion of the invention;

Figure 4 is a section taken along 4—4 of Figure 1;

Figure 5 is an enlarged elevation of a portion of Figure 3;

Figure 6 is a side elevation of Figure 5;

Figure 7 is an elevation of a modification of Figures 5 and 6;

Figure 8 is a side elevation of the modification shown in Figure 7;

Figure 9 is another modification of the invention; and

Figure 10 is a sectional view in the casting position of the modification shown in Figure 9.

In the drawings the numeral 1 represents the fishing line on which a pilot bobber 2 is slidably received with a knot 3 on the line at the desired fishing depth. Usually the knot 3 is tied on the line with a separate short piece of line so that the knot can be readily moved to any desired position. The line 1 passes slidably through the bore 4 of a buoyant bobber 5, preferably of round cross section and tapered toward one end to provide a streamlined contour for easy and accurate manipulation. In the preferred form of the invention, a pair of diametrically opposed fins 6 and 7 are attached to the large or top end of the bobber 5 to assist in holding the bobber in a true course during the cast. The bore or opening 4 extending through the bobber 5 preferably contains a liner 8 or any suitable material such as metal or plastic so that the surface of the bore is smooth.

In the fishing position shown in Figure 1, the line 1 attached on one end to the conventional reel or rod, extends the desired distance through the bore 4 of the bobber 5 with the pilot bobber 2 resting against the top 9 of the bobber 5 and restrained from moving along the line 1 by knot 3. Below the bobber 5 the end of the line 1 is attached as shown to the eye 10 of a semi-rigid element 11 incompressible along its longitudinal axis, of a length substantially equal to the length of the bobber. The element 11 is preferably formed of light weight, resilient, rust-proof material such as music wire. A weight 12 of lead or similar material is attached to opposite end of the element 11 with eyes 13 above and below the weight 12. A leader 14, well known in the art, of substantially double the length of the element 11 is attached to one of the eyes 13. As best shown in Figure 3, the leader is attached to the lower eye 13, but may if desired be attached at the upper eye 13. The weight 12 is of a larger diameter than the bore 4 so that it will not pass into the bore. A hook 15 and suitable bait or lure, not shown, is connected to the leader 14. The bore 4 of the bobber 5 is of a size to accommodate the various parts of the assembly in the telescoped position as subsequently explained.

The incompressible element 11 in one form of the invention has a short arm 16 pivotally attached to the element 11 near the end to which the line 1 is attached normally lying to against the element 11 and extending downward. The arm is pivotally mounted on the element 11 so as to be limited in its movement to substantially 180° in one direction from a position adjacent the element 11, that is, it always remains on the same side of the element 11. The arm 16 in the form shown in Figures 5 and 6 is in the form of a narrow closed loop 17 with one end 18 of the loop pivotally mounted to the element 11 so that the top end 19 of the loop 17 is near the end of the element 11 when the loop extends upward and lying against the element 11.

As shown in Figures 7 and 8, the top end of the element 11 is in the form of a long narrow closed loop 20 with a member 21 extending through the center of the loop. An arm 22 is pivotally mounted on the member 21 and is of such a length as to extend slightly beyond the ends of the loop 20 when lying parallel to the loop in either direction. This prevents the arm 22 from passing through the loop at any time.

In Figure 9 a modification of the invention is shown in which the line 1 is attached to the incompressible element 23 through the upper eye 24. A weight 25 is fastened to the element 23 between the eyes 24 and an eye 26 is formed on the opposite end of the element to which the leader 27 is attached. The lower eye 24 serves as a convenient means of attaching extra weights if the conditions warrant, also protects the line 1 from possible damage from pinching between the weight 25 and the end of the bobber 5. The leader 27 and the element 23 are of substantially equal length and that length preferably equal to that of the bobber or longer if desired. In this modification the element 23 and leader 27 may extend above the bobber in the telescoped position without interference in withdrawing when the bobber hits the water.

In using the improved bobber assembly shown in Figures 1 to 8 inclusive for casting, the depth of fishing is estimated and the knot 3 is tied in the line 1. The leader 14 is then doubled or looped over the arm 16 which is then pivoted up against the element 11 as shown in Figure 3 which allows the hook 15 with the bait to hang just below or adjacent the weight 12. The line 1 is drawn up through the bobber 5 by reeling in the line which telescopes the element 11 and doubled-up leader 14 into the bore of the bobber 5, as shown in Figure 3. The weight 12 engages the end of the bore 4 to limit the travel of the assembly through the bore and the hook hangs out just below the lower end of the bobber. The cast is made and when the bobber strikes the water, the weight draws the assembly from the telescoped position as the bobber floats on the water in the upright position. As the upper end of the element 11 clears the bore 4, the arm 16 drops down to the position shown in Figure 1 and indicated by the phantom lines in Figures 6 and 8. The leader then extends below the weight as shown in Figures 1 and 3 and the line 1 continues to slide through the bobber until the pilot bobber 2 contacts the knot 3 stopping the passage of the line through the bobber. If the hook or any part of the line should become entangled or rest on the bottom the pilot bobber 2 would not contact the bobber 5 so that it would lie on its side to indicate this. The line could be reeled in and the necessary adjustments made and the bobber cast out again.

In the modification shown in Figures 9 and 10, the incompressible element 23 is folded up along the line 1 as best seen in Figure 9 and then the line is reeled up to telescope the line, element 23 and leader 27 in to the bore of the bobber 5 until the weight 25 engages the wall of the bore 4. The element 23 and leader 27 in the telescoped position can extend above the top of the bobber if desired without interfering with the operation of assembly. When the cast is made, the weight pulls the element 23 and leader 27 through the bore of the bobber and as soon as the element is free of the bobber, it swings down with the leader extending below to the fishing position.

While only the use of the bobber has been described for casting, it is readily apparent that it may readily be adapted to still fishing or spinning reel and rod fishing. While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. A fishing bobber assembly comprising a buoyant body of greater length than diameter and having a bore extending longitudinally therethrough, a liner in said bore, a resilient wire element of a length substantially equal to that of the body, a connection on one end of said element for attachment of a fishing line, a second connection on the other end of said element for attachment of a leader, means near the first mentioned end of said element to releasably hold a leader in a doubled up position adjacent said element, the element and doubled up leader adjacent thereto adapted to be slidably inserted in the bore of said body, and a weight having a periphery of a size larger than that of said bore adjacent the second mentioned end of said element and having portions adapted to abut the lower peripheral edge of said bore to limit the movement in one direction of the element into the bore, said means releasing the leader from the doubled up position when the element is withdrawn from the bore by the weight when the bobber strikes the water.

2. A fishing bobber assembly for casting comprising an elongated buoyant body and tapered toward one end having a bore extending longitudinally therethrough with at least a pair of diametrically opposed fins extending radially from and attached to the large end of said body, a liner in said bore, a resilient wire element of a length substantially equal to that of the body, a connection on one end of said element for attachment of a fishing line, a second connection on the other end of said element for attachment of a leader, means near the first mentioned end of said element to releasably hold a leader in a doubled up position adjacent said element, the element and doubled up leader adjacent thereto adapted to be slidably inserted in the bore of said body, and a weight having a periphery of a size larger than that of said bore adjacent the second mentioned end of said element and having a portion adapted to abut the lower peripheral edge of said bore to limit the movement in one direction of the element into the bore, said means releasing the leader from the doubled up position when the element is withdrawn from the bore by the weight when the bobber strikes the water.

3. A fishing bobber assembly comprising an elongated buoyant body of substantially circular cross-section and tapered toward one end and having an opening extending axially through said body, a resilient wire element and of a length at least that of said body having means on one end for attachment of a line and means on the opposite end for attachment of a leader, said wire element of a size to move freely in and out of said opening and being of a diameter substantially less than that of the bore, a weight of a size larger than said opening attached adjacent one end of said element to engage said body to limit the movement in one direction of said element into the body, said wire element and leader adapted to lie in a side by side relation when in the opening and to be released from the side by side position when the element and leader are withdrawn from the opening.

4. A fishing bobber assembly for casting comprising an elongated buoyant body, having an opening extending axially therethrough with at least a pair of diametrically opposed fins attached to the large end of said body, a resilient wire element of a length at least that of said body having means on one end for attachment of a line and means on the opposite end for attachment of a leader, said wire element of a size to move freely in and out of said opening and being of a diameter substantially less than that of the bore, a weight of a size larger than said opening attached adjacent one end of said element to engage said body to limit the movement in one direction of said element into the body, said wire element and leader adapted to lie in a side by side relation in the opening in said body and to be released from the side by side position when the element and leader are withdrawn from the opening.

5. A fishing bobber assembly including a buoyant body of greater length than diameter and having a bore extending longitudinally therethrough, a resilient element of a length substantially equal to that of the body, a connection on one end of said element for attachment to a fishing line, a second connection on the other end of said element for an attachment of a leader, means near the first mentioned end of said element to releasably hold a leader in a doubled up position adjacent said element, said means comprising an arm mounted near the first mentioned end of said element adapted to pivot from a position adjacent said element and pointing toward said first mentioned end to a position adjacent said element and pointing toward said second mentioned end, the aforementioned bore through said body being of a size to slidably receive the element and doubled up leader adjacent thereto, and a weight having a periphery larger than the periphery of said bore adjacent the second mentioned end of said element and having a portion adapted to abut the lower peripheral edge of said bore to limit the movement in one direction of the element into the bore, said arm being in the up position with the leader looped thereover while the leader and wire are retained in the bore and falling to the down position when the wire is withdrawn from the bore to release the leader from said doubled up position.

6. A fishing bobber assembly including a buoyant body of greater length than diameter and having a bore extending longitudinally therethrough, a resilient element of a length substantially equal to that of the body, a connection on one end of said element for attachment to a fishing line, a second connection on the other end of said element for an attachment of a leader, means near the first mentioned end of said element to releasably hold a leader in a doubled up position adjacent said element, said means comprising an arm mounted near the first mentioned end of said element so constructed and arranged to pivot substantially 180° from a position adjacent said element, the aforementioned bore through said body being of a size to slidably receive the element and doubled up leader adjacent thereto, and a weight having a periphery larger than the periphery of said bore adjacent the second mentioned end of said element and having a portion adapted to abut the lower peripheral edge of said bore to limit the movement in one direction of the element into the bore, said arm being in the up position with the leader looped thereover while the leader and wire are retained in the bore and falling to the down position when the wire is withdrawn from the bore to release the leader from said doubled up position.

References Cited in the file of this patent

UNITED STATES PATENTS

| | | |
|---|---|---|
| 2,498,815 | McVay | Feb. 28, 1950 |
| 2,554,318 | Wordrip et al. | May 22, 1951 |
| 2,607,154 | Martens | Aug. 19, 1952 |
| 2,645,051 | Stofleth | July 14, 1953 |

FOREIGN PATENTS

| | | |
|---|---|---|
| 1,027,032 | France | Feb. 11, 1953 |